March 15, 1932.  J. A. BARBER  1,849,970
AEROPLANE PARACHUTE
Filed Jan. 7, 1931   5 Sheets-Sheet 1
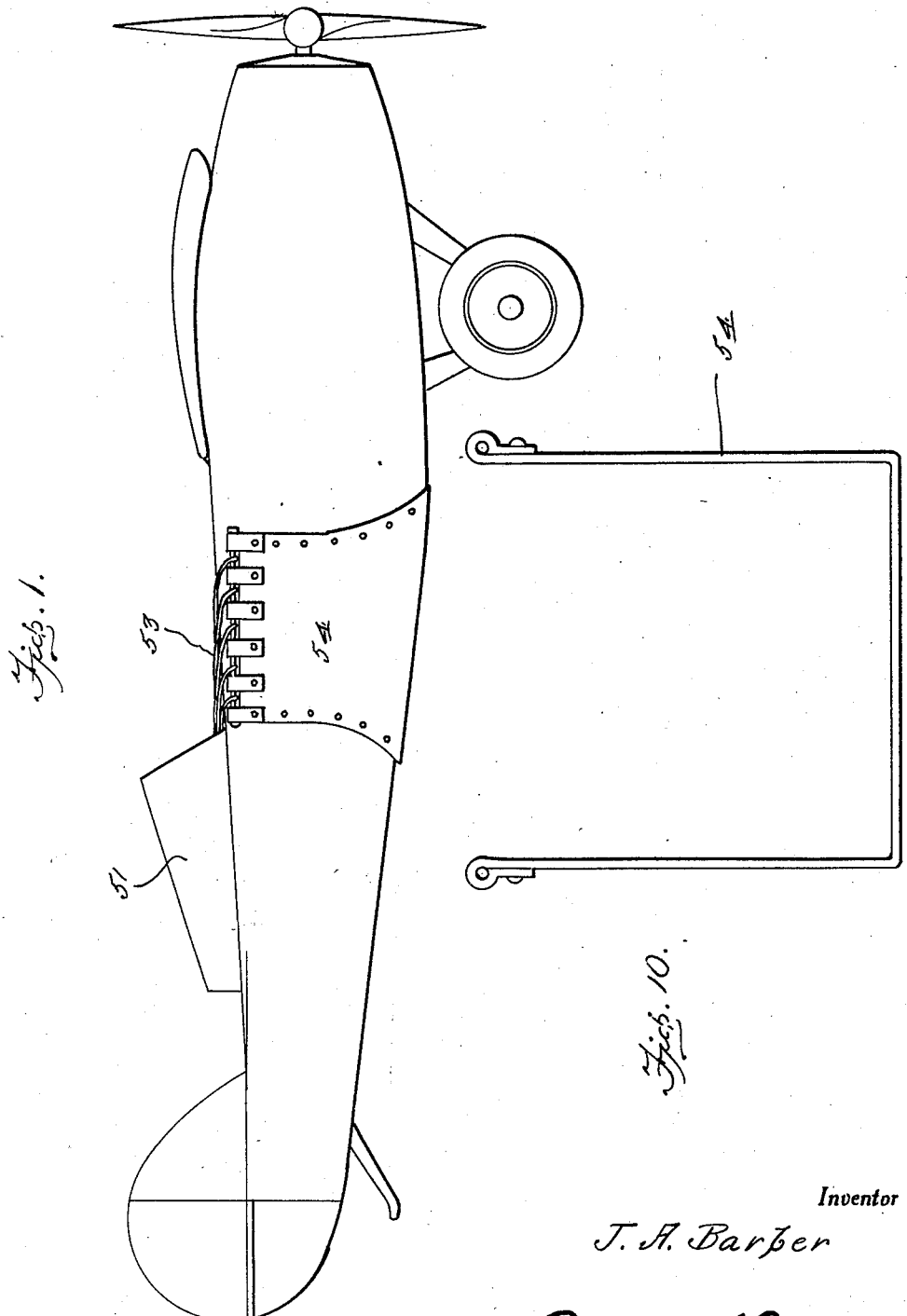
Inventor
J. A. Barber
By Clarence A. O'Brien
Attorney

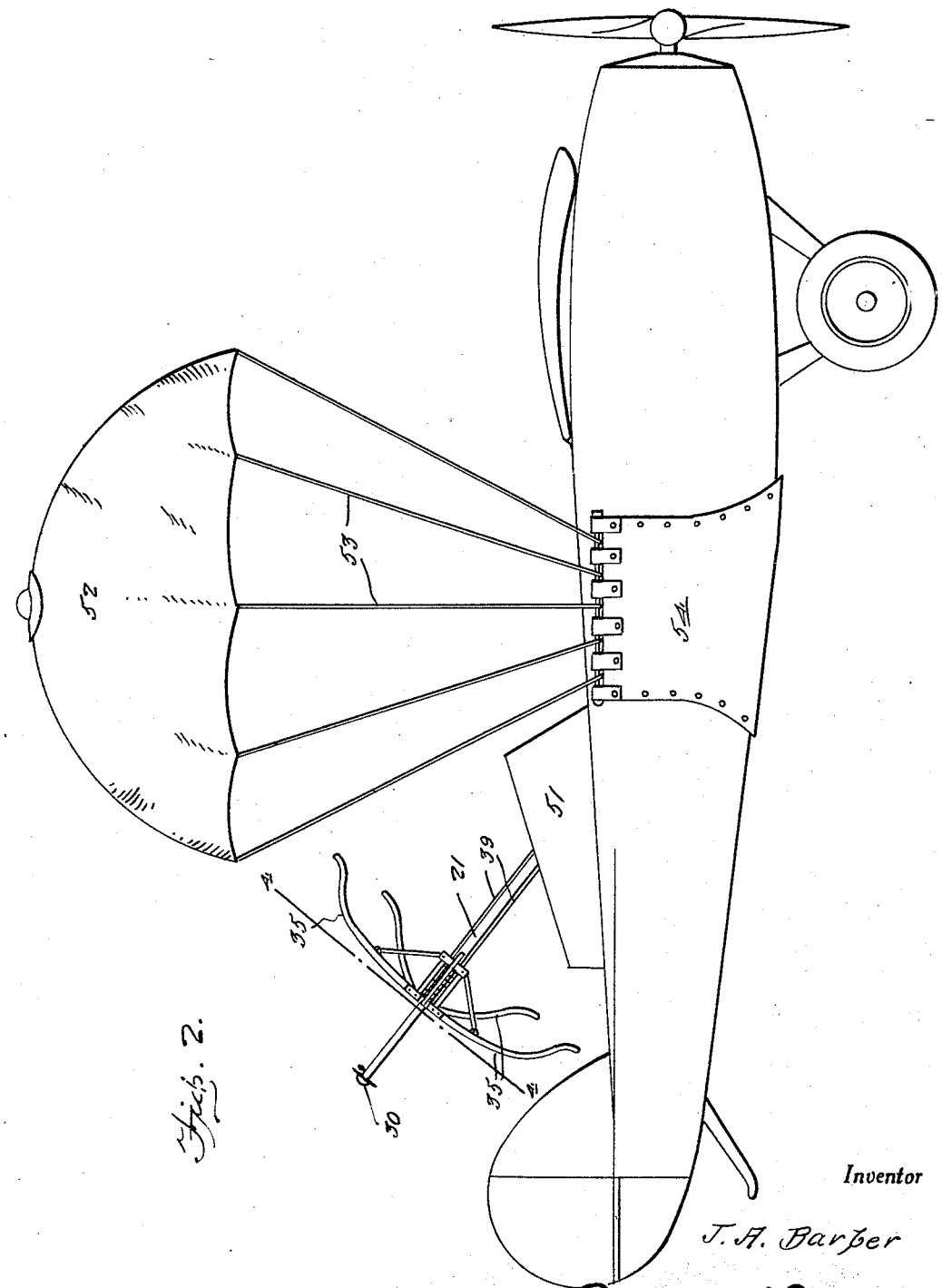

March 15, 1932. J. A. BARBER 1,849,970
AEROPLANE PARACHUTE
Filed Jan. 7, 1931 5 Sheets-Sheet 3
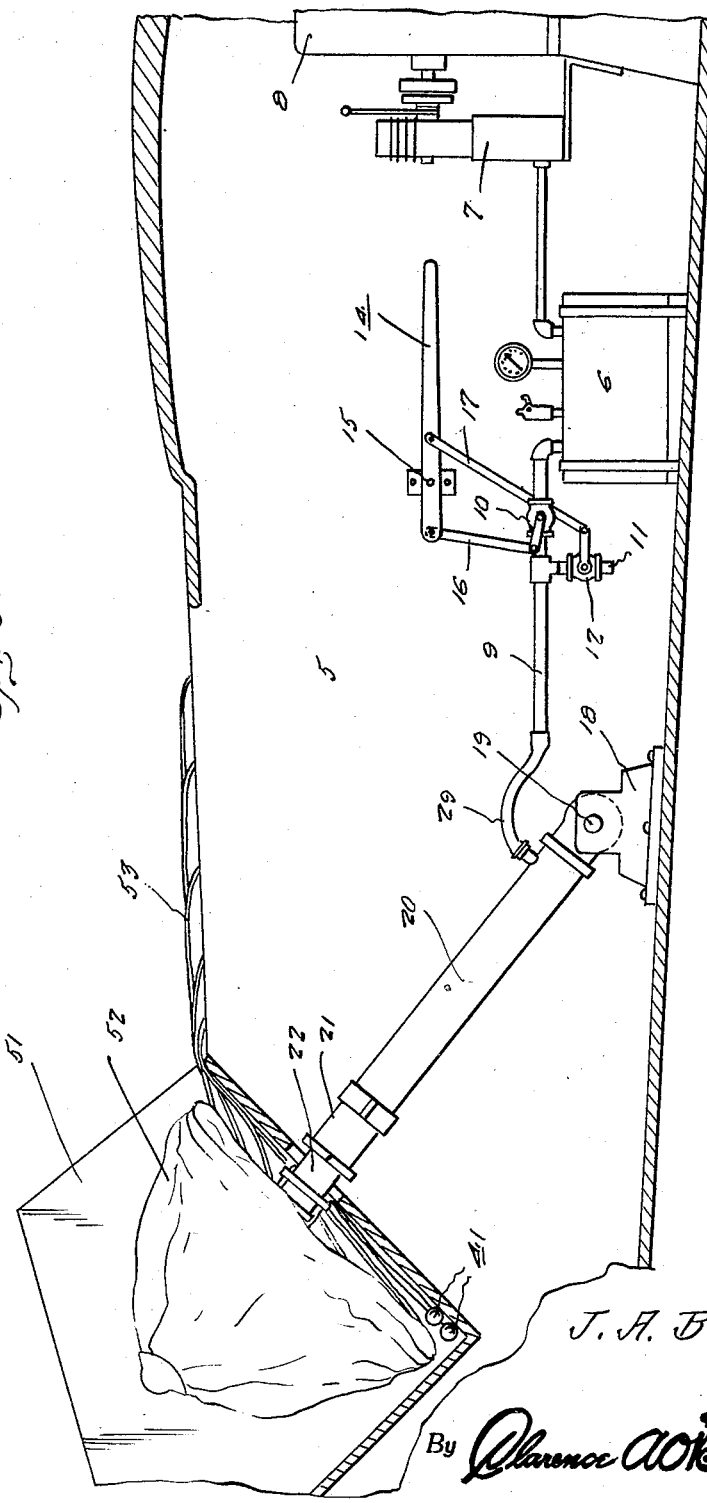
Inventor
J. A. Barber
By Clarence A. O'Brien
Attorney March 15, 1932.  J. A. BARBER  1,849,970
AEROPLANE PARACHUTE
Filed Jan. 7, 1931   5 Sheets-Sheet 4
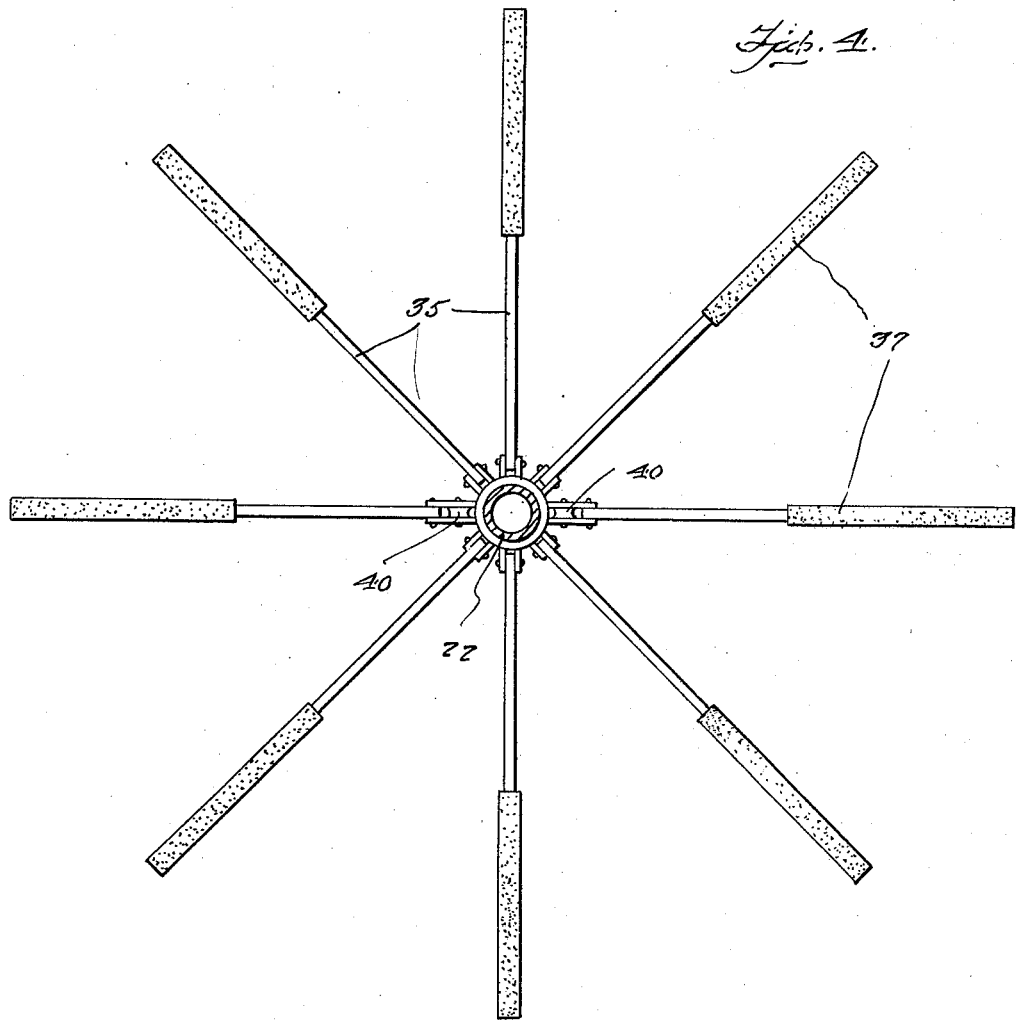
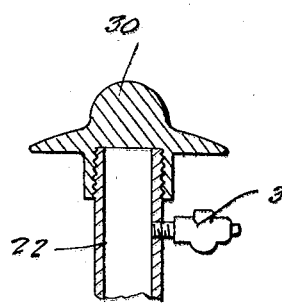
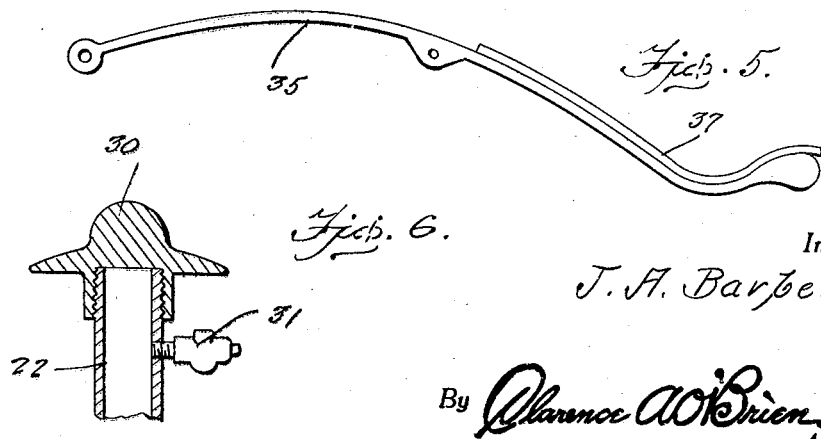
Inventor
J. A. Barber
By Clarence A. O'Brien
Attorney

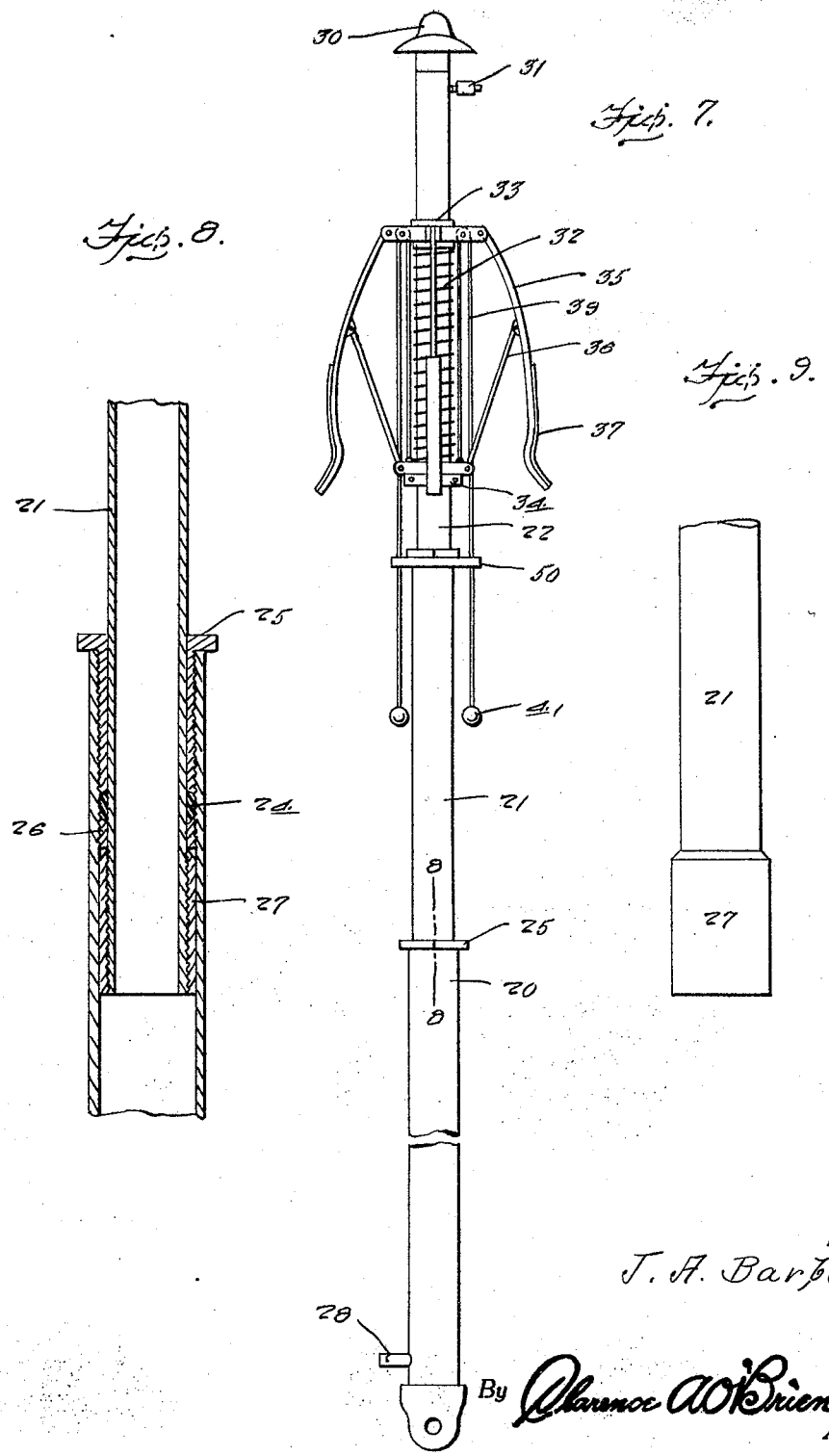

Patented Mar. 15, 1932

1,849,970

UNITED STATES PATENT OFFICE

JOHN A. BARBER, OF OLEAN, NEW YORK

AEROPLANE PARACHUTE

Application filed January 7, 1931. Serial No. 507,261.

The present invention relates to an apparatus to provide for the safety of an aeroplane when in trouble and permit the same to fall slowly to the ground without danger of injury to the aeroplane or the occupant thereof.

The object of the invention resides in the provision of a parachute in combination with means for partially spreading the parachute so that the air will get under the same quickly and the parachute become effective almost immediately as may be desired by the operator.

Another very important object of the invention resides in the provision of an apparatus of this nature which is comparatively simple in its construction, compact and convenient in its arrangement of parts, easy to manipulate, quick of action, thoroughly efficient and reliable in use and operation, and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

In the drawings:

Figure 1 is a side elevation of an aeroplane embodying the features of my invention showing the parachute in folded position.

Figure 2 is a similar view showing the parachute in released position.

Figure 3 is a fragmentary vertical longitudinal section through the aeroplane fuselage showing the parachute in folded position.

Figure 4 is a detail sectional view taken substantially on the line 4—4 of Figure 2.

Figure 5 is a side elevation of one of the spreading ribs.

Figure 6 is a detail section through the outer member of the telescopic sectional mast.

Figure 7 is a detail elevation of the mast.

Figure 8 is a sectional view therethrough taken substantially on the line 8—8 of Figure 7.

Figure 9 is a detail view of the inner end of one of the mast sections, and

Figure 10 is an edge view of the saddle.

Referring to the drawings in detail it will be seen that the numeral 5 denotes an aeroplane fuselage having an air storage tank 6 connected with a compressor 7 operatively connected with an engine 8. A pipe 9 leads from the storage tank 6 and has a control valve 10 therein. An outlet branch 11 leads downwardly from the pipe 9 and has a valve 12 therein. A lever 14 is rockable as at 15 and has link connections 16 and 17 with valves 10 and 12 respectively so that when the valve 10 is opened, the valve 12 is closed and vice versa.

A base bracket 18 is fixed in the bottom of the fuselage and has rockably mounted therein as at 19 bottom closed end of hollow mast section 20 with which are telescopically associated sections 21 and 22, the former being slidable in the section 20 and the latter being slidable in the section 21. Of course any number of these sections may be used as may be necessary in the practical embodiment of the invention in different makes of aeroplanes or other aircraft. All of the sections are hollow and have air-tight slidable fits with respect to each other as illustrated to advantage in Figure 8. In this figure it will be seen that packing 24 is disposed between sleeves 25 and 26 threaded in the section and on the inner section of the pair shown in this figure is threaded a stop sleeve 27 limiting the outward movement of the sections with respect to one another. Numeral 28 denotes an intake nipple on the bottom portion of the section 20 with which a flexible conduit 29 is connected and also connected with the pipe 9. On the outer end of the section 22 there is threaded a head 30. A safety valve 31 is connected with the section 22. A coil spring 32 is disposed about the section 22 and impinges against collar 33 fixed on the section 22 and a collar 34 slidable on the section 22. Ribs 35 are pivotally connected with the collar 33 by suitable means and have links 36 pivoted to intermediate portions thereof and pivotally connected with movable collar 34.

Suitable padding 37 is provided on the outer end of the rib.

Cables 39 are secured to the collars 34, trained over pulleys 40 mounted on the collars 32 and at their free ends have balls 41 and these balls are adapted to abut against the collar 50 for limiting the outward movement of the ribs and to also limit the spreading or expansion of the spring.

In the top portion of the fuselage there is built a housing 51 which depends down into the fuselage and has walls extending thereabove. The casing is open at the top. The mast extends into the casing. Numeral 52 denotes a parachute connected by cables 53 with a saddle 54 fixed under the fuselage. In folded position the parachute 52 has its central portion over the head 30 and is folded about the ribs which are in the position shown in Figure 7. Now by actuating the lever 14 the valve 10 may be open so that the air under pressure will flow into the hollow mast and cause the extension of the sections and the extension of the rib thereby projecting and spreading the parachute so that the air will quickly get thereunder to make the same effective.

It is thought that the construction, operation, utility and advantages of this invention will now be quite apparent to those skilled in this art without a more detailed description thereof.

The present embodiment of the invention has been described in considerable detail merely for the purposes of exemplification since in actual practice it attains the features of advantage enumerated as desirable in the statement of the invention and the above description.

Having thus described my invention, what I claim as new is:

In combination with an aeroplane, a parachute, flexible means connecting the parachute with the aeroplane, and means operable to initially spread the parachute from a folded position to quickly bring the same into effectiveness, said last mentioned means comprising a mast formed of telescopic sections the innermost one of which is pivotally connected to the aeroplane, said sections being hollow and the outer section having a closed end, and means for ejecting air under pressure into the section to extend the same with respect to one another, a plurality of ribs pivotally connected with the outer section and means causing the spreading of the ribs when the sections are extended.

In testimony whereof I affix my signature.

JOHN A. BARBER.